United States Patent
Daito

(10) Patent No.: US 7,060,908 B2
(45) Date of Patent: Jun. 13, 2006

(54) ELECTRIC WIRE HOLDING STRUCTURE OF PROTECTOR

(75) Inventor: Koji Daito, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/999,971

(22) Filed: Dec. 1, 2004

(65) Prior Publication Data

US 2005/0118852 A1  Jun. 2, 2005

(30) Foreign Application Priority Data

Dec. 1, 2003 (JP) .......................... P2003-401705

(51) Int. Cl.
  *H02G 3/04* (2006.01)
(52) U.S. Cl. ................. 174/135; 174/68.1; 174/68.3; 174/72 A
(58) Field of Classification Search ............. 174/48, 174/68.1, 68.3, 70 C, 71 R, 72 A, 95, 97, 174/98, 99 R, 100, 101, 135; 248/49, 68.1, 248/73, 74.1, 74.2, 74.4; 296/152
See application file for complete search history.

(56) References Cited

U.S. PATENT DOCUMENTS

| | | | | |
|---|---|---|---|---|
| 4,864,082 A | * | 9/1989 | Ono et al. .................. | 174/97 |
| 4,951,716 A | * | 8/1990 | Tsunoda et al. ........... | 174/68.3 |
| 5,597,980 A | * | 1/1997 | Weber ....................... | 174/72 A |
| 5,716,044 A | * | 2/1998 | Peterson et al. ............ | 296/152 |
| 6,049,040 A | * | 4/2000 | Biles et al. ................ | 174/68.3 |
| 6,126,123 A | * | 10/2000 | Yang ......................... | 248/74.1 |
| 6,229,091 B1 | * | 5/2001 | Ogawa et al. ............ | 174/72 A |
| 6,462,276 B1 | * | 10/2002 | Shimizu et al. ........... | 174/65 R |
| 6,830,225 B1 | * | 12/2004 | Kato ........................... | 248/49 |
| 6,861,589 B1 | * | 3/2005 | Katsumata et al. ........ | 174/68.3 |
| 6,878,879 B1 | * | 4/2005 | Takahashi et al. ........ | 174/72 A |

FOREIGN PATENT DOCUMENTS

JP  2-14220 U  1/1990

* cited by examiner

*Primary Examiner*—Dean A. Reichard
*Assistant Examiner*—Adolfo Nino
(74) *Attorney, Agent, or Firm*—Sughrue Mion, PLLC

(57) ABSTRACT

In a pair of tongue pieces 23, 24 which are opposed to each other and extended from the end portions in the longitudinal direction of the cylindrical body 20a in which the electric wire harness 11 is accommodated, the rising portions 23a, 24a are provided in the directions opposing to each other. Therefore, the rising portions 23a, 24a are located on the sides of the electric wire harness 11. Accordingly, when the tongue pieces 23, 24 are attached to the electric wire harness 11, the sides of the electric wire harness 11 can be protected by the rising portions 23a, 24a. Therefore, when the adhesive tape 12 is wound in such a manner that the tongue pieces 23, 24 are pressed to each other, the sides of the electric wire harness 11 can be easily protected and fixed.

3 Claims, 4 Drawing Sheets

PRIOR ART

ELECTRIC WIRE HOLDING STRUCTURE OF PROTECTOR

BACKGROUND OF THE INVENTION

1. Field of the Invention

The present invention relates to an electric wire holding structure of a protector. For example, the present invention relates to an electric wire holding structure of a protector for protecting an electric wire harness laid in a vehicle body of an automobile.

2. Related Art

A conventional protector for protecting a wire harness shown in Unexamined Japanese Utility Model Publication.

As shown in FIG. 4, this protector 100 for a wire harness is composed in such a manner that a pair of wire harness accommodating portions 103, which include a bottom face 101 and sides walls 102 rising on both sides of the bottom face 101, are arranged in parallel to each other and the side walls 102 are pivotally combined with each other by the hinge 104. At both end portions of each bottom face 101 in the longitudinal direction, the flat tongue pieces 101a are provided being extended.

In this connection, in the case of the protector 100 for a wire harness described above, when both wire harness accommodating portions 103 are closed to each other so as to be formed into a cylindrical shape and an adhesive tape is wound round the electric wire harness and then the electric wire harness is fixed to the tongue piece 101a, since the tongue piece 101a is flat and both side portions of the tongue piece 101a are open, it is necessary to tightly wind the adhesive tape so as to cover the side portions.

Therefore, it is necessary to use a long adhesive tape to be wound, which takes much time and costs much labor. Accordingly, the manufacturing cost is increased.

SUMMARY OF THE INVENTION

The present invention has been accomplished in view of the above problems. It is an object of the present invention to provide a protector for a wire harness which can be easily fixed to an electric wire harness by a short adhesive tape.

In order to accomplish the above object, the present invention provides an electric wire holding structure of a protector comprising: a cylindrical body capable of accommodating an electric wire harness; and a pair of tongue pieces provided at end portions of the cylindrical body in the longitudinal direction, wherein the tongue pieces are formed into a substantial belt-shape and arranged at positions opposing to each other so that the electric wire harness can be interposed between the tongue pieces, and each tongue piece has a rising portion extending from one tongue piece to the other tongue piece.

In the electric wire holding structure of a protector composed as described above, in a pair of tongue pieces which are extended from the end portions of the cylindrical body in the longitudinal direction being opposed, the rising portions are provided so that they can be directed to each other. Therefore, the rising portions are located on the sides of the electric wire harness. Due to the above structure, when the tongue pieces are attached to the electric wire harness, the sides of the electric wire harness are protected by the rising portions. Accordingly, when the adhesive tape is wound in such a manner that the tongue pieces are held down, the sides of the electric wire harness can be easily protected and fixed.

The present invention provides an electric wire holding structure of a protector, in which each rising portion is formed at a position where the rising portion of one tongue piece can not come into contact with the other tongue piece.

In the electric wire holding structure of a protector composed as described above, the rising portions are arranged at positions where they are not contacted with each other. Therefore, when the tongue pieces are attached to the electric wire harness, even when the tongue pieces are made to come close, no interference is caused in the rising portions. For the above reasons, even when both tongue pieces are pressed to the electric wire harness, the rising portions do not collide with each other. Therefore, both tongue pieces can be pressed to the electric wire harness, that is, the electric wire harness can be easily attached to the tongue pieces.

The present invention provides an electric wire holding structure of a protector, in which the cylindrical body includes a main body and cover portion capable of accommodating the electric wire harness when they are combined with each other, and the tongue pieces are provided in the main body and cover portion.

In the electric wire holding structure of a protector composed as described above, the cylindrical portion is formed by the combination of the main body with the cover portion, and the tongue pieces are extended from the end portions of the main body and the cover portion.

Therefore, when the cover portion is put on the main body, the cylindrical portion can be formed and both tongue pieces are located at the opposing positions.

ADVANTAGE OF THE INVENTION

According to the present invention, it is possible to solve the conventional problem in which the adhesive tape is wound a large number of times so as to fix the tongue pieces of the protector to the electric wire harness. Therefore, it is possible to protect and fix the side portions of the electric wire harness by a short adhesive tape.

MOST PREFERRED EMBODIMENT

DETAILED DESCRIPTION OF THE PREFERRED EMBODIMENTS

Figure 1:
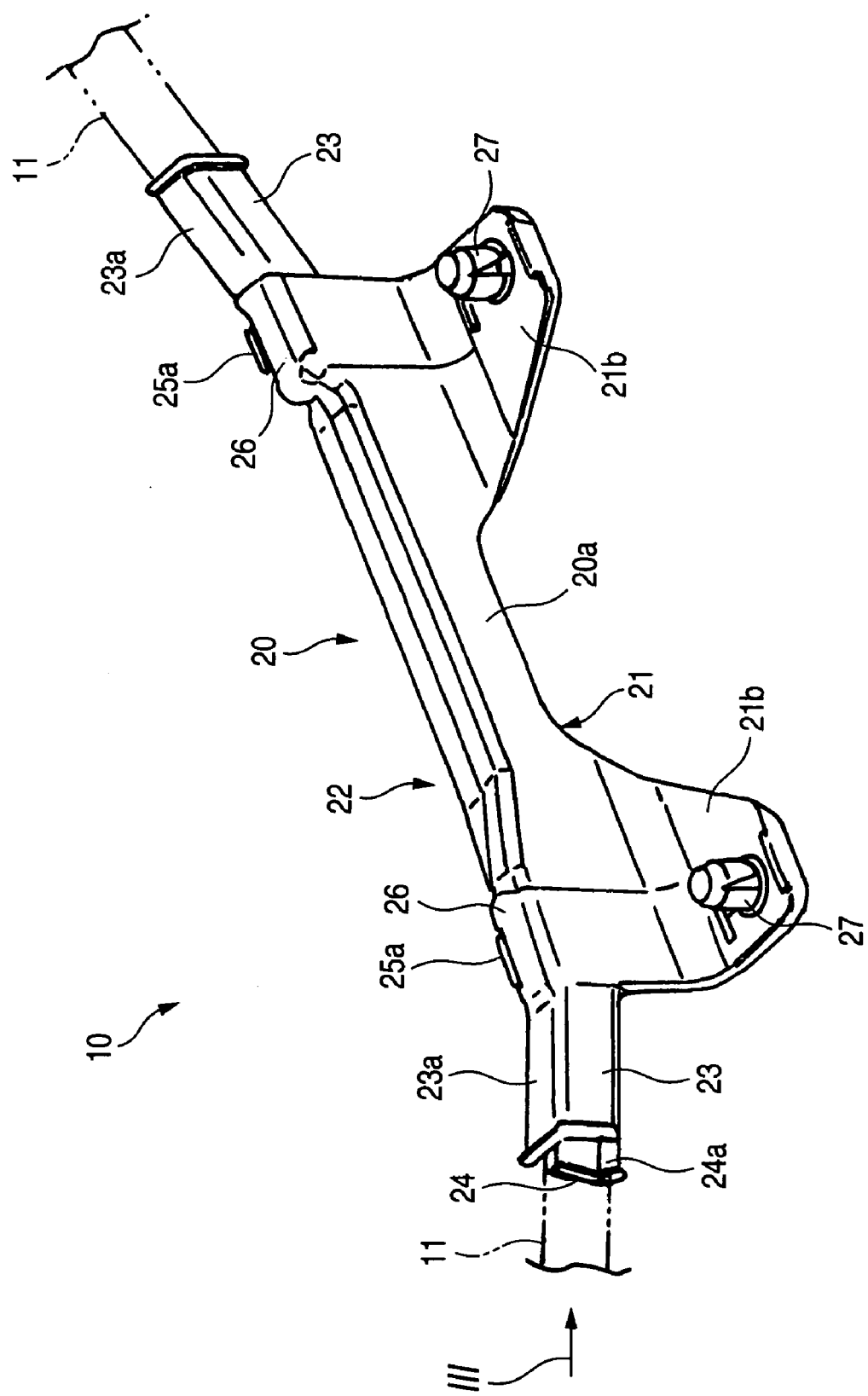
FIG. 1 is a perspective view showing an embodiment of the electric wire holding structure of a protector of the present invention.
Figure 3A:
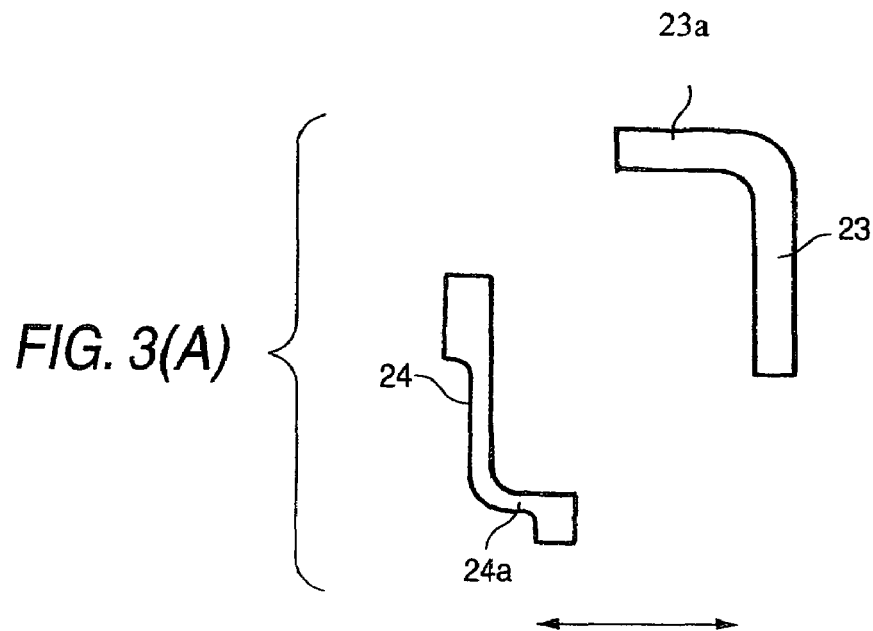
FIG. 3(A) is an end face view showing a positional relation of the tongue piece before the adhesive tape is wound.
Figure 3B:
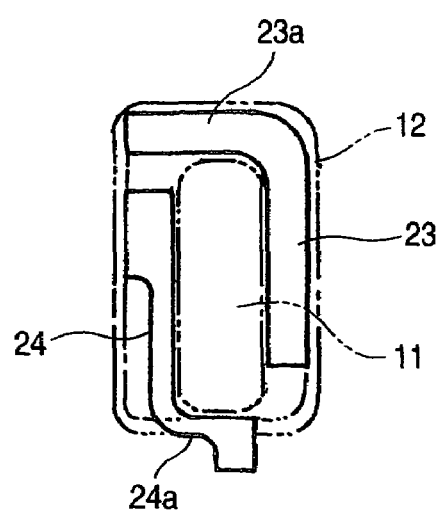
FIG. 3(B) is an end face view showing a positional relation of the tongue piece after the adhesive tape has been wound.
Figure 4:
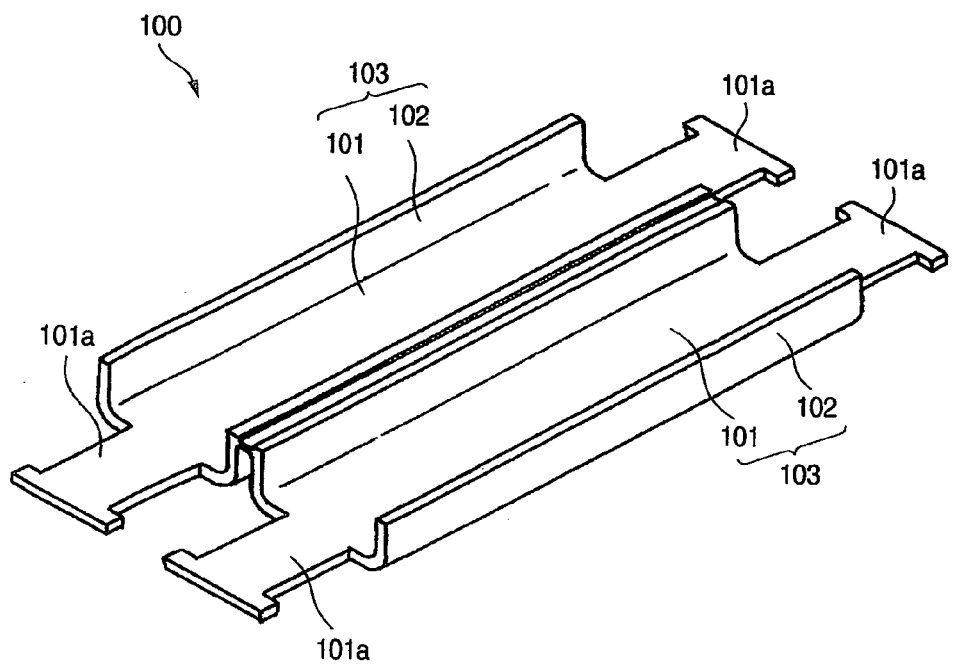
FIG. 4 is a perspective view showing a conventional protector for a wire harness.

Referring to the drawings, an embodiment of the present invention will be explained in detail as follows. FIG. 1 is a perspective view showing an embodiment of the electric wire holding structure of a protector of the present invention, FIG. 2 is a perspective view showing a cover portion and a main body of the electric wire holding structure, FIG. 3(A)

is an end face view showing a positional relation of the tongue piece before the adhesive tape is wound, and FIG. 3(B) is an end face view showing a positional relation of the tongue piece after the adhesive tape has been wound.

Figure 2:
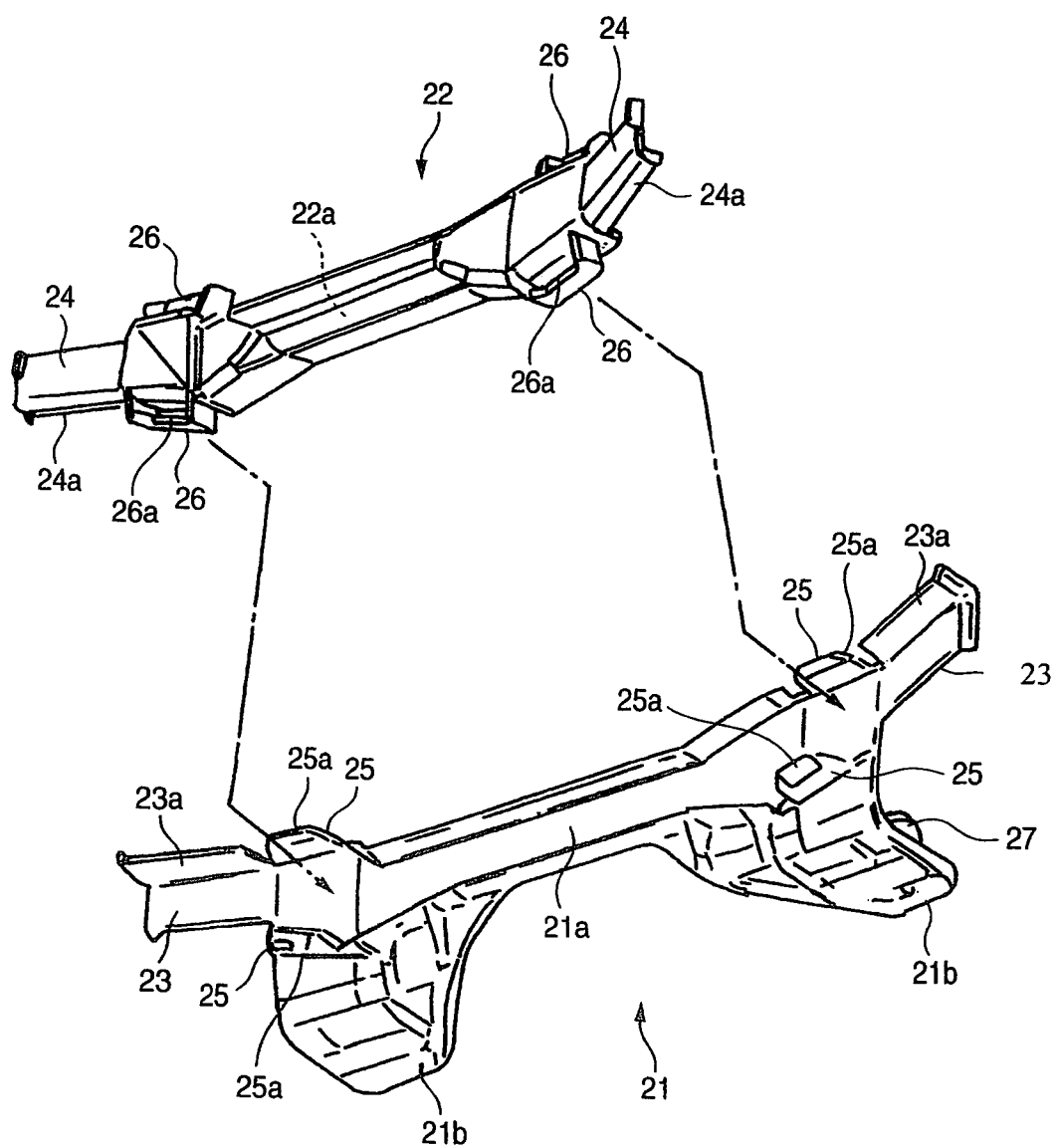
FIG. 2 is a perspective view showing a cover portion and a main body of the electric wire holding structure.

As shown in FIG. 2, the protector 20, to which the electric wire holding structure of a protector of the embodiment of the present invention is applied, includes a main body 21 and a cover portion 22. When the electric wire holding portion 21a, the cross section of which is a C-shape, of the main body 21 and the electric wire holding portion 22a, the shape of which is substantially flat, of the cover portion 22 are combined with each other, the cylindrical body 20a, the shape of which is rectangular, capable of accommodating the electric wire harness 11 is formed.

In each electric wire holding portion 21a, 22a, a pair of tongue pieces 23, 24 are provided in both end portions in the longitudinal direction.

In the peripheries of both end portions of the main body 21 in the longitudinal direction, the engaging pieces 25 for holding the cover portion 22 are provided, and the engaging pawl 25a is provided at the forward end portion of each engaging piece 25.

On the other hand, the engaging portion 26 is provided in the cover portion 22 at the position corresponding to the engaging piece 25, and the space 26a is formed in which the engaging piece 25 passes. In this connection, the bracket 21b, the shape of which is flat, by which the main body 21 is attached to a vehicle body, is provided in the main body 21, and the clip 27 for attaching the bracket 21b to the vehicle body is provided in the main body 21.

Accordingly, when the engaging piece 25 is inserted into the space 26a of the engaging portion 26, the engaging pawl 25a of the engaging piece 25 is engaged with the engaging portion 26. Therefore, the cover portion 22 and the main body 21 are integrated into one body of the cylindrical body 20a so that the cover portion 22 can not fall off from the main body 21.

As shown in FIG. 2, the tongue piece 23 provided on the main body 21 side and the tongue piece 24 provided on the cover portion 22 side are formed into a substantial belt shape and arranged at positions opposing to each other so that the electric wire harness can be interposed between both tongue pieces 23 and 24.

In the tongue pieces 23, 24, the rising portions 23a, 24a are provided which rise from the end edges opposed to each other in the longitudinal direction. The rising portions 23a, 24a are provided being directed in the different direction from each other.

Although the rising portion 23a on the main body 21 side is provided being directed to the cover portion 22 side, it is not contacted with the tongue piece 24 on the cover portion 22 side. In the same manner, although the rising portion 24a on the cover portion 22 side is provided being directed to the main body 21 side, it is not contacted with the tongue piece 23 on the main body 21.

In FIG. 3(A), a positional relation between the rising portion 23a of the tongue piece 23 on the main body 21 side and the rising portion 24a of the tongue piece 24 on the cover portion 22 side is shown under the condition that the engaging piece 25 of the main body 21 is inserted into the engaging portion 26 of the cover portion 22. In FIG. 3(B), a state in which the thin electric wire harness 11 is accommodated and wound by the adhesive tape 12 is shown.

When the electric wire harness 11 is accommodated in the state shown in FIG. 3(A) and the tongue pieces 23, 24 are made to come close to each other in the direction of the arrow in the drawing, as shown in FIG. 3(B), the tongue piece 23, 24 come close to each other, however, the rising portions 23a, 24a do not come close to each other but move substantially in parallel to each other. Both tongue pieces 23 and 24 are provided at positions so that the tongue piece 23 and the rising portion 24a can not interfere with each other and the tongue piece 24 and the rising portion 23a can not interfere with each other.

According to the electric wire holding structure 10 of a protector described above, the rising portions 23a, 24a are provided in the tongue pieces 23, 24 being directed in the opposing direction. Therefore, the rising portions 23a, 24a are located on the sides of the electric wire harness 11. Even when the tongue pieces 23, 24 are made to come close to each other, the rising portions 23a, 24a do not interfere with each other.

Therefore, even when the electric wire harness 11 is thin in the case of attaching the tongue pieces 23, 24 to the electric wire harness 11, the sides of the electric wire harness 11 can be protected by the rising portions 23a, 24a. Therefore, when the adhesive tape 12 is wound in such a manner that the tongue pieces 23, 24 are pressed to each other, the electric wire harness 11 can be easily protected and fixed.

In this connection, the electric wire holding structure of a protector of the present invention is not limited to the above specific embodiment. It should be noted that appropriate variations and improvements can be made.

For example, in the above embodiment, the cylindrical body 20a is composed in such a manner that the main body 21 and the cover portion 22 are combined with each other. However, it is possible to apply the present invention to an integrated cylindrical body.

What is claimed is:

1. An electric wire holding structure of a protector comprising:
    a cylindrical body capable of accommodating an electric wire harness within; and
    a pair of L-shaped tongue pieces provided at each of first and second end portions of the cylindrical body in the longitudinal direction, wherein at each of the first and second end portions, one of the tongue pieces is arranged to oppose the other tongue piece such that the electric wire harness is interposed between the pair of tongue pieces, and each of the L-shaped tongue pieces includes an erected portion extending in a direction substantially perpendicular to the longitudinal direction of the cylindrical body.

2. An electric wire holding structure of a protector according to claim 1, wherein each erected portion is formed at a position where the erected portion of one tongue piece can not come into contact with the erected portion of the other tongue piece.

3. An electric wire holding structure of a protector according to claim 1, wherein the cylindrical body includes a main body and cover portion capable of accommodating the electric wire harness when they are combined with each other, and at each of the first and second end portions, one of the tongue pieces is provided on the main body and the other tongue piece is provided on the cover portion.

* * * * *